(12) United States Patent
Gloyer et al.

(10) Patent No.: US 7,214,757 B2
(45) Date of Patent: May 8, 2007

(54) POLYURETHANE ELASTOMERS AND SHAPED ARTICLES PREPARED THEREFROM

(75) Inventors: Paul Gloyer, Rochester, NY (US); Alan Priebe, Rochester, NY (US); George R. Walgrove, III, Rochester, NY (US); M. Cristina DeJesus, Fairport, NY (US); William B. Vreeland, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 992 days.

(21) Appl. No.: 09/802,760

(22) Filed: Mar. 8, 2001

(65) Prior Publication Data

US 2001/0046576 A1    Nov. 29, 2001

Related U.S. Application Data (60) Provisional application No. 60/188,522, filed on Mar. 10, 2000, provisional application No. 60/188,067, filed on Mar. 9, 2000.

(51) Int. Cl.
*C08G 18/10* (2006.01)

(52) U.S. Cl. .......................................... 528/60; 528/71

(58) Field of Classification Search ................. 528/60, 528/71
See application file for complete search history.

(56) References Cited

U.S. PATENT DOCUMENTS

| | | | |
|---|---|---|---|
| 2,951,443 A | 6/1960 | Byrne | 101/426 |
| 2,969,386 A | 1/1961 | McElroy | 260/471 |
| 3,455,855 A | 7/1969 | Houghton et al. | 260/18 |
| 3,620,616 A | 11/1971 | Davidson et al. | 355/3 |
| 3,633,543 A | 1/1972 | Pitasi et al. | 118/21 |
| 3,708,482 A | 1/1973 | Milan et al. | 260/247.7 C |
| 3,781,105 A | 12/1973 | Meager | 355/3 |
| 3,858,144 A | 12/1974 | Bedard et al. | 319/492 |
| 3,920,325 A | 11/1975 | Swift | 355/3 |
| 3,954,332 A | 5/1976 | Fisher | 355/3 |
| 3,954,333 A | 5/1976 | Goel | 355/3 |
| 3,959,573 A | 5/1976 | Eddy et al. | 428/425 |
| 3,959,574 A | 5/1976 | Seanor et al. | 428/425 |
| 4,058,879 A | 11/1977 | Lentz et al. | 29/132 |
| 4,062,812 A | 12/1977 | Safford et al. | 252/500 |
| 4,116,894 A | 9/1978 | Lentz et al. | 521/94 |
| 4,390,679 A | 6/1983 | Weiss et al. | 528/64 |
| 4,476,292 A | 10/1984 | Ham et al. | 528/60 |
| 4,729,925 A | 3/1988 | Chen et al. | 428/425 |
| 4,762,941 A | 8/1988 | Chen et al. | 588/44 |
| 5,212,032 A | 5/1993 | Wilson et al. | 430/65 |
| 5,259,989 A | 11/1993 | Schlueter, Jr. et al. | 252/500 |
| 5,286,566 A | 2/1994 | Schlueter, Jr. et al. | 428/413 |
| 5,286,570 A | 2/1994 | Schlueter, Jr. et al. | 428/423.1 |
| 5,321,476 A | 6/1994 | Gross | 355/271 |
| 5,420,677 A | 5/1995 | Gross et al. | 355/277 |
| 5,571,457 A | 11/1996 | Vreeland et al. | 252/519 |
| 5,728,496 A | 3/1998 | Rimai et al. | 430/47 |
| 5,849,399 A | 12/1998 | Law et al. | 428/212 |
| 5,897,247 A | 4/1999 | Tombs et al. | 399/308 |
| 5,968,656 A | 10/1999 | Ezenyilimba et al. | 428/423.1 |

FOREIGN PATENT DOCUMENTS

EP   604334   *   6/1994

* cited by examiner

*Primary Examiner*—Rachel Gorr
(74) *Attorney, Agent, or Firm*—Carl F. Ruoff

(57) ABSTRACT

Disclosed herein are polyurethane elastomers and shaped articles prepared therefrom comprising charge-control agents to provide electrical conductivity to the elastomers, thereby allowing for their use in electrophotographic processes. The elastomers comprise a polyisocyanate prepolymer, a polyether prepolymer, and a hardener mixture comprised of at least one additional polyol and a charge-control agent. When used in an electrophotographic process, the elastomers are capable of exhibiting resistivities of less than $6 \times 10^9$ ohm-cm for 600,000 images or more.

19 Claims, 1 Drawing Sheet

POLYURETHANE ELASTOMERS AND SHAPED ARTICLES PREPARED THEREFROM

CROSS-REFERENCE TO RELATED APPLICATIONS

This Application claims benefit under 35 USC §119 (e) of prior co-pending U.S. Patent Application Ser. No. 60/188,067 filed Mar. 9, 2000, and prior co-pending U.S. Patent Application Ser. No. 60/188,522, filed Mar. 10, 2000, the disclosures of which are incorporated herein by reference in their entirety.

FIELD OF THE INVENTION

This invention relates to compositions and shaped articles comprised of polyurethane elastomers, and specifically polyether polyol based polyurethane elastomers, which compositions further comprise charge-control agents to provide electrical conductivity to the elastomer compositions.

BACKGROUND OF THE INVENTION

Polyurethane elastomers are generally well known for use in making shaped articles of manufacture. Methods of making polyurethane elastomers are disclosed for example in U.S. Pat. Nos. 2,969,386 and 4,476,292. Such shaped articles of manufacture include tough wear-resistant parts, foundry patterns, core boxes, impact pads for railroad draft gears, dye pads for metal forming punch presses and a variety of shaped mechanical rubber-like components such as shock mitigation pads.

Another important group of shaped articles made from polyurethane elastomers includes electrically biasable parts for use in electrophotographic copying equipment, such as transfer rollers and transfer belts. Such transfer rollers and belts cooperate electrically with a photoconductive surface to establish a directional force field between the transfer roller or belt and the photoconductive surface. For indirect transfer, the direction of the force field assists in moving a toner-developed photoconductive image from the photoconductive surface to the transfer roller or belt. Subsequently the direction of the force field is reversed so that the image now residing on the transfer roller or belt can be transferred to a more permanent surface such as paper. Indirect transfer is described in U.S. Pat. No. 5,571,457 and also U.S. Pat. No. 5,212,032, the teachings of which are incorporated herein by reference. Direct transfer methods as known in the art can also be employed to transfer toner from the photoconductive surface directly to the permanent surface, i.e., paper.

Transfer rollers, belts and other electrically biased shaped articles used in electrophotographic equipment and their use in an electrophotographic process are further described in detail in U.S. Pat. Nos. 3,959,573, 3,959,574, and 5,897,247, the teachings of which are incorporated herein by reference.

U.S. Pat. No. 3,959,574 describes transfer rollers and belts made from polyurethane elastomers wherein the polyurethane elastomer contains certain additives designed to establish a certain level of resistivity in the elastomers. The additives according to the patent must be soluble in or dispersible in the polyurethane elastomer. The additives are worked into the polyurethane by direct melting of the additive into the polyurethane or incorporating a solution or dispersion of the additive into the polyurethane. The problem is that over time the additives disclosed in U.S. Pat. No. 3,959,574, for various reasons, are leached out of the elastomer. This results in an undesirable decline in the level of conductivity (with a corresponding rise in resistivity) in the polyurethane elastomer, thereby leading to poor copy quality.

Effective transfer of an unfused toned image from a photoconductor surface to a receiver, such as paper, using biased direct or indirect transfer techniques generally requires a relatively constant electric field, and therefore constant current flow, through the biased transfer roller member onto the surface of the receiver. Constant current flow through the transfer roller requires that the bulk resistivity of the roller member, and in particular the semi-conductive polyurethane elastomer, should ideally remain fairly constant regardless of the total amount of charge transferred over the life of the roller member. Typically, however, in actual practice the roller member bulk resistivity increases during use of the member, i.e., its conductivity decreases, which effectively reduces the image transfer latitude with respect to various image receivers and operating environments. Once the roller member resistivity exceeds a critical value, the transfer of images to the receiver is impaired and results in poor copy quality, thereby requiring replacement of the roller.

U.S. Pat. Nos. 4,729,925 and 4,762,941 to Chen et al. disclose certain polyurethane elastomers comprised of charge-control agents for use in making electrically biasable parts in electrophotographic copying equipment. The charge-control agent is said to be added to improve the ability of the polyurethane elastomers to retain pre-established levels of resistivity. The polyurethane is said to be made from a polyisocyanate prepolymer formed with an excess amount of an isocyanate compound. While the resulting polyurethane elastomers can exhibit improved resistance to undesirable increases in resistivity during use, such elastomers can also in some instances lead to initial operational problems and poor copy quality due to an unnecessarily small initial resistivity level. Further, such charge-control agents can be rather expensive to produce and/or obtain commercially, so it would also be desirable to reduce the amount of charge-control agents that are used so as to reduce cost. While such electrically biasable parts exhibit resistance to degradation during use and therefore have a longer useful life, the resistance of the polyurethane material can still increase during use to unacceptable levels.

As can be seen, it would be desirable to develop improved polyurethane elastomers which are capable of exhibiting pre-established levels of resistivity within acceptable levels, both initially and over time during use, so that the performance of electrically biasable parts made with such elastomers can be improved over their useful lifecycle and costs associated therewith are reduced.

SUMMARY OF THE INVENTION

The foregoing objectives are obtained by the present invention which seeks to improve the ability of polyurethane elastomers to retain pre-established levels of resistivity and thereby increase their useful life, particularly when used in a electrophotographic process. In general, the polyurethane compositions and shaped articles of the present invention are made from starting materials selected in amounts such that the equivalent ratio of hydroxyl functionality to isocyanate functionality in the resulting polyurethane elastomer is from 0.96 to 1.04. Such polyurethane elastomers can exhibit significantly increased resistance to degradation when used in an electrophotographic process, thereby leading to longer life of biasable parts made with the polyurethane elastomers, as is illustrated, for example, in the preferred embodiments of the invention described hereinafter.

Therefore, in one aspect, the invention concerns a polyurethane elastomer comprising the reaction product of:
  a polyisocyanate prepolymer formed by reacting an isocyanate with a polyol, said polyisocyanate prepolymer being present in an amount of from 45 to 70 weight percent based on total weight of the elastomer composition;
  a polyether polyol prepolymer present in an amount of from 25 to 50 weight percent based on total weight of the elastomer composition; and
  a hardener mixture comprising at least one additional polyol and at least one charge-control agent, the hardener mixture being present in an amount of from 1 to 25 weight percent of the total elastomer composition, the amounts of the polyisocyanate prepolymer, the polyether polyol prepolymer, and hardener mixture being selected such that the equivalent ratio of hydroxyl functionality to isocyanate functionality is from 0.96 to 1.04.

In another aspect, the invention concerns a polyurethane elastomer comprising the reaction product of:
  a polyisocyanate prepolymer formed by reacting an isocyanate with a polyol, said polyisocyanate prepolymer being present in an amount of from 45 to 70 weight percent based on total weight of the elastomer composition;
  a polyether polyol prepolymer present in an amount of from 25 to 50 weight percent based on total weight of the elastomer composition; and
  a hardener mixture comprising at least one additional polyol and at least one charge-control agent capable of being copolymerized with the polyisocyanate prepolymer, the polyether polyol prepolymer and the hardener mixture such that the charge-control agent is covalently bonded to the polyurethane elastomer, the hardener mixture being present in an amount of from 1 to 25 weight percent of the total elastomer composition, the amounts of the polyisocyanate prepolymer, the polyether polyol prepolymer, and hardener mixture being selected such that the equivalent ratio of hydroxyl functionality to isocyanate functionality is from 0.96 to 1.04, and the charge-control agent is present in an amount of less than 2 weight percent based on total weight of the elastomer.

In preferred embodiments, the charge-control agent is a polyol capable of being copolymerized with the polyisocyanate prepolymer, the polyether polyol prepolymer, and the hardener mixture, and more preferably the charge-control agent is selected from at least one of formula (I) or formula (II):

$$R^1-\overset{O}{\underset{\|}{C}}-\underset{R^6\text{-}M^+}{\bigcirc}-\overset{O}{\underset{\|}{C}}-R^1 \qquad (I)$$

$$R^7-\overset{O}{\underset{\|}{C}}-\underset{R^2\text{-}M^+}{\bigcirc}-\overset{O}{\underset{\|}{C}}-R^7 \qquad (II)$$

wherein $R^1$ represents:

$$-\left[O-(CH_2)_5-\overset{O}{\underset{\|}{C}}\right]_m-OCH_2CH_2OCH_2CH_2O-\left[\overset{O}{\underset{\|}{C}}-(CH_2)_5-O\right]_n-H;$$

$R^6$ represents sulfonate, oxyphenylene sulfonate, oxycyclohexylene sulfonate, or p-toluenesulfonamidosulfonyl;

$R^2$ represents oxyphenylene sulfonate, oxycyclohexylene sulfonate, or p-toluenesulfonamidosulfonyl;

$R^7$ represents:

$$-(O-R^3-\overset{O}{\underset{\|}{C}})_p-OR^4-O-(\overset{O}{\underset{\|}{C}}-R^3-O)_q-H;$$

$R^3$ represents a straight or branched chain alkylene group having 2 to 7 carbon atoms;

$R^4$ is the same as $R^3$ or is $$-(R^5-O)_x-R^5$$

$R^5$ is the same as $R^3$;

x is 1 to 10, and preferably from 2 to 7;

m and n are integers which together are of sufficient value to achieve an $R^1$ weight average molecular weight of 300 to 30,000;

p and q are integers which together are of sufficient value to achieve an $R^7$ weight average molecular weight of 300 to 30,000; and M represents hydrogen, an alkali metal, ammonium, or $P^+(C_6H_5)_3CH_3$.

In another aspect, the invention is directed to a shaped article comprising:
  an electrically conducting core; and
  a layer of a polyurethane elastomer disposed on said core, the elastomer comprising any of the polyether polyurethane compositions corresponding to the present invention as described hereinabove.

The above-described elastomers and shaped articles made therefrom may be advantageously used as transfer rollers and transfer belts in an electrophotographic process, and such articles can maintain suitable pre-selected resistivities, i.e., for example a resistivity of less than $6 \times 10^9$ ohm-cm, for from 600,000 to 1,000,000 images, preferably at least 1,000,000 images, and more preferably at least 2,000,000 images.

DETAILED DESCRIPTION OF THE INVENTION

The polyether-based polyurethane elastomers of the present invention can be made, in general, using starting materials and methods similar to those taught in U.S. Pat. Nos. 4,729,925 and 4,762,941, including the preferred polyol charge-control agents disclosed therein, the disclosures of which are hereby incorporated by reference in their entirety. As mentioned in these patents, the polyol charge-control agents in general contain an ionic functional group which imparts electrical conductivity to the resulting elastomers, and preferably, the polyol charge-control agents comprise hydroxyl group functionality which will result in the charge-control agents being covalently bound into the elastomer upon formation thereof by reaction with the other components of the elastomer as discussed hereinbelow.

In general, the polyurethane elastomers are the chemical reaction products of (a) a polyisocyanate prepolymer formed by reacting at least one isocyanate compound (preferably an aromatic polyisocyanate compound) with at least one polyol compound, the polyisocyanate prepolymer being present in an amount of from 45 to 70 weight percent, based on total weight of the elastomer, (b) a polyether polyol prepolymer present in an amount of from 25 to 50 weight percent based on total elastomer weight; and (c) a hardener mixture comprising at least one polyol compound which can act as a chain extender and/or cross-linking agent, preferably an amine-based polyol, a polyether polyol, or mixtures thereof, and a charge-control agent as described hereinafter, which hardener mixture is present in an amount of from 1 to 25 weight percent based on total weight of the elastomer, preferably from 1.5 to 5 weight percent.

In a preferred embodiment, the polyurethane elastomers are formed from a mixture that comprises:

(a) a polyisocyanate prepolymer which is the reaction product of:
  (i) an aromatic polyisocyanate, and
  (ii) a polyol;
(b) a polyether polyol prepolymer, and
(c) a hardening mixture comprising:
  (i) a polyol selected from the group consisting of amine-based polyols, polyether polyols and mixtures thereof which can act as a chain extender and/or cross-linking agent, and
  (ii) less than 2 weight percent, based on total weight of the elastomer, of a charge-control agent effective to impart a desired level of resistivity to the resulting polyurethane elastomer (and more preferably from 0.1 to 0.9 weight percent and more preferably from 0.4 to 0.7 weight percent of the charge-control agent based on total elastomer weight).

The polyisocyanate prepolymer can comprise recurring units derived from other polyols, polyamines and mixtures thereof, and aromatic as well as aliphatic polyisocyanates.

Exemplary polyisocyanate compounds which may be used to make the prepolymer are those noted in U.S. Pat. Nos. 2,969,386 and 4,476,292, the relevant disclosures of which are incorporated herein by reference, such as 4,4'-diphenylmethane diisocyanate; 1,5-napthalene diisocyanate; 3-isocyanatomethyl-3,5,5-trimethylcyclohexyl isocyanate (isophorone diisocyanate); 4,4'-methylene bis-(cyclohexylisocyanate); hexamethylene diisocyanate; 1,3-cyclohexane bis(methylisocyanate); 2,2,4-trimethylhexamethylene diisocyanate, reduced methylene diphenyl diisocyanate and combinations thereof, as well as related aliphatic and cycloaliphatic polyisocyanates which may be substituted with other organic or inorganic groups that do not adversely affect the course of the polymerization reaction. 4,4'-methylene bis(cyclohexylisocyanate), hexamethylene diisocyanate, methylene diisocyanate and isophorone diisocyanate are among the preferred prepolymers. Commercially available polyisocyanate prepolymers, such as ADIPRENE® and VIBRATHANE® polymers are available from Uniroyal Chemical Company.

The term "aliphatic", as used herein, includes those carbon chains which are substantially non-aromatic in nature. They may be saturated or unsaturated, unbranched, branched or cyclic in configuration and may contain various substituents. Such aliphatic isocyanates generally have an equivalent weight of from 60 to 160 and a viscosity of 1 to 1500 centipoises at 25° C. Exemplary of liquid long chain aliphatic polyisocyanates are dodecyl diisocyanate and tridecyl diisocyanate.

The term "aromatic" as used herein includes a diatropic moiety derived from benzene, naphthalene, anthracene, phenanthrene, biphenyl, and the like. They may be unsubstituted or substituted, for example, with halo, nitro, saturated alkyl, saturated alkoxy, saturated alkylthio, or aryl substituents. Included in this definition also are alkylenediarylene structures, for example, methylenediphenylene, and ethylenediphenylene. Exemplary of aromatic diisocyanates are toluene-2,4-diisocyanate, m-phenylene diisocyanate, and methylene-di-p-phenylene diisocyanate.

Preferably, the polyisocyanate prepolymer functional groups are blocked with an agent, such as methyl ethyl ketoxime, so as to stabilize the prepolymer and prevent reaction prior to use.

Polyols useful in preparing the polyisocyanate prepolymer and finished polyurethane elastomers are any suitable polyol free of aliphatic unsaturation which will not adversely interfere with the relative humidity sensitivity of the polyurethane compositions, the resistivity of the polyurethane compositions, the electrical life of the polyurethane compositions, or otherwise adversely affect the properties and/or performance of the polyurethane elastomers in effecting image transfer of the biasable member on which the polyurethane is coated. Such polyols can include, for example, amine-based polyols, polyether polyols, polyester polyols, and mixtures thereof. Examples of such polyols are disclosed in U.S. Pat. Nos. 2,969,386; 3,455,855; 4,476,292; and 4,390,679, the teachings of which are incorporated herein by reference. They include aliphatic polyols and glycols such as trimethylolpropane, 1,3-butylene glycol, 1,4-butylene glycol, propylene glycol, polyethers such as poly(tetramethylene glycols) and poly(propylene glycols), low molecular weight polyester polyols, such as polyethylene adipate, and a poly(caprolactone)diol.

As mentioned above, the polyols used in the present invention, particularly for the polyol prepolymer, are preferably soft segment polyether polyols as exemplified in U.S. Pat. Nos. 2,969,386; 3,455,855; 4,476,292; and 4,390,679.

In general, suitable polyether polyols include aliphatic alkylene glycol polymers having an alkylene unit composed of at least two carbon atoms. These aliphatic alkylene glycol polymers are exemplified by polyoxypropylene glycol and polytetramethylene ether glycol. Di-, tri-, and tetrafunctional compounds are available with the trifunctional ones being exemplified by the reaction product of glycerol or trimethylol propane and propylene oxide. A typical polyether polyol is available from Union Carbide under the designation PPG-425. Also, another polyether polyol suitable for use in preparing the polyurethane materials of the present invention is a trimethylolpropane based polyfunctional polyol available from The Dow Chemical Company as Voranol® polyether polyol. Suitable polyether polyols will generally have weight average molecular weights of from 60–10,000, and preferably 500 to 3,000, with the diols ranging from 60–200, the triols from 400–700, and the tetrols from 400–2000. A commercially available polyether polyol prepolymer is polytetramethylene ether glycol, for example TERATHANE® polyether glycols available from E.I. duPont de Nemours & Company of Wilmington, Del. Polyether polyols are preferred since they are generally hydrolitically stable, i.e., not as sensitive to changes in relative humidity, in typical operating environments relative to other polyols.

Suitable charge-control agents include those disclosed in U.S. Pat. No. 4,116,894, the relevant teachings of which are incorporated herein by reference, and include ionic compounds such as organic dyes, organic pigments, organic salts, polyelectrolytes, inorganic salts, inorganic pigments, and charge transfer complexes or materials which produce charge transfer complexes within the polyurethane elastomer composition. Useful quaternary ammonium compounds are disclosed in U.S. Pat. Nos. 4,058,879; 4,062,812; 5,286,566; and 5,286,570, the teachings of which are incorporated herein by reference. Preferred charge-control agents are those which are capable of reacting with the polyurethane elastomer prepolymers so as to become covalently bound in the elastomer, such as those disclosed hereinafter.

A class of preferred charge-control agents are the dicarboxylate polyol charge-control compounds disclosed in U.S. Pat. Nos. 4,729,925 and 5,571,457, the teachings of which are incorporated herein by reference. In general, the polyol charge-control agents can have formula (I) or formula (II):

(I)

(II)

wherein $R^1$ represents:

$R^6$ represents sulfonate, oxyphenylene sulfonate, oxycyclohexylene sulfonate, or p-toluenesulfonamidosulfonyl;

$R^2$ represents oxyphenylene sulfonate, oxycyclohexylene sulfonate, or p toluenesulfonamidosulfonyl;

$R^7$ represents:

$R^3$ represents a straight or branched chain alkylene group having 2 to 7 carbon atoms;

$R^4$ is the same as $R^3$ or is $R^5$ is the same as $R^3$;

x is 1 to 10, and preferably from 2 to 7;

m and n are integers which together are of sufficient value to achieve an $R^1$ weight average molecular weight of 300 to 30,000;

p and q are integers which together are of sufficient value to achieve an $R^7$ weight average molecular weight of 300 to 30,000; and M represents hydrogen, an alkali metal, ammonium, or $P^+(C_6H_5)_3CH_3$.

Examples of preferred polyol charge-control agents are:

and wherein $R^8$ is y and z are selected to provide a weight average molecular weight for $R^8$ of 530 and M is a cation such as potassium, sodium, methyltriphenylphosphonium, or ammonium trimethylbenzylammonium.

A preferred charge-control agent is poly(oxy(1-oxo-1,6-hexanediyl)),alpha,alpha'oxydi-2,1-ethanediyl)bis(w-hydroxy-5-sulfo-1,3-benzenedicarboxylate (2:1), ion (1-)methyltriphenyl-phosphonium salt available from Eastman Kodak Company of Rochester, N.Y.

In the polyurethane elastomer of the present invention, the preferred charge-control agents described hereinabove are copolymerized with the polyisocyanate prepolymer and other polyols used to make the polyurethane elastomers. Thus, the charge-control agent becomes an integral part of the polymer and is not subject to being leached out of the polyurethane elastomers as is the case where the charge-control agent is simply an additive.

The elastomer generally comprises less than 6 weight percent, based on total elastomer weight, of a charge-control agent effective to impart a desired level of resistivity to the resulting polyurethane elastomer composition, and with the preferred polyol charge-control agents described hereinabove, even more suitably less than 2 weight percent, and preferably less than 1 weight percent based on the total weight of the elastomer. In especially preferred embodiments, the amount of the preferred charge-control agent is preferably from 0.1 to 0.9 weight percent and more preferably from 0.4 to 0.7 weight percent of the charge-control agent. Use of less than 1 weight percent of the charge-control agent is preferred, in that the initial resistivity of the resulting composition is not so low as to create poor image quality.

The final conductive polyether polyurethane composition is produced by chain-extending and/or cross-linking the prepolymer with a hardener mixture comprising additional amine-based polyols or polyether polyols and the charge-control agents described hereinabove.

The polyol hardener mixture comprises at least an amine-based polyol, a polyether polyol, or blends of these polyols. The amine-based polyols employed generally have an equivalent weight of from 30 to 6000 and a viscosity of from 1 to 20,000 centipoises at 25 to 60° C. A wide variety of aromatic and aliphatic diamines may form a part of the amine-based polyols. Such polyols include N, N,N',N'-tetrakis(2-hydroxypropyl)ethylene diamine, and a polymer of ethylene diamine, propylene oxide, and ethylene oxide. A typical aromatic amine-based polyol is available from Upjohn under the designation ISO-NOL 100; a typical aliphatic amine-based polyol is available from BASF under the designation QUADROL; and a typical ethylene diamine/propylene oxide/ethylene oxide polymer is available from BASF under the designation PLURACOL 355. A preferred polyol cross-linking agent is TP30 available from Perstorp Polyols Inc. of Toledo, Ohio.

The polyether polyurethanes of this invention are prepared by admixing the polyisocyanate prepolymer, polyether prepolymer, and hardener mixture. The amounts of the polyisocyanate prepolymer, the polyether polyol prepolymer, and hardener mixture are selected such that the equivalent ratio of hydroxyl functionality to isocyanate functionality in the admixture is from 0.96 to 1.04, preferably from 0.98 to 1.04, and more preferably from 1.00 to 1.04. By the term "equivalent ratio", it is meant that the amounts of the reactants are selected such that the ratio of equivalent weight of hydroxyl (—OH) functional moieties to the equivalent weight of isocyanate (—NCO) functional moieties in the resulting admixture is within the above-described ranges. At an equivalent ratio of less than 0.96, enhanced resistance to degradation of the polyurethane elastomer in an electrophotographic process is not realized to a desirable extent, and at an equivalent ratio above 1.04, undesirable mechanical properties can arise. Catalysts and optional additives can also be included within the hardener composition. After mixing the components, the admixture can be shaped into articles using a mold or other process as known in the art, and generally articles of the polyurethane elastomer with a green strength sufficient to be demolded and/or handled without structural damage are obtained after about 40 minutes at 110° C. Curing to a solid, thermoset material can be accomplished by generally further heating the green article at a temperature of from 90 to 110° C. for at least about 8 hours.

Catalysts suitable for preparing the polyether-based polyurethane elastomers of this invention include any of those known in the art, and may comprise, for example, heavy metals utilized in amounts of 0.1% metal, by weight of hardener composition, e.g., organo tin, organo zinc, mercury and lead compounds. Tertiary amines may also be used. The amount used is typically about 0.5 weight percent, based on the weight of the precursor admixture described above.

Optional additives include anti-foaming agents such as glycerine, an ethyl acrylate-2-ethylhexyl acrylate copolymer, dimethyl siloxane copolymers and silicones; antioxidants such as esters of β-(3,5-di-tertiarybutyl-4-hydroxyphenyl)-propionic acid with monohydric or polyhydric alcohols, for example, methanol, octadecanol, 1,6-hexanediol, neopentylgylcol, thiodiethyleneglycol, diethyleneglycol, triethyleneglycol, pentaerythritol, tris-hydroxyethyl isocyanurate, and di-hydroxyethyl oxalic acid diamide; UV absorbers and light stabilizers such as 2-(2'-hydroxyphenyl) benzotriazoles and sterically hindered amines such as bis-(2,2,6,6-tetramethylpiperidyl)-sebacate, bis-(1,2,2,6,6-pentamethylpiperidyl)-sebacate, n-butyl-3,5-di-tertiarybutyl-4-hydroxybenzyl malonic acid, bis-(1,2,2,6,6-pentamethylpiperidyl)-ester, condensation product of 1-hydroxyethyl-2,2,6,6-tetramethyl-4-hydroxypiperidene and succinic acid, condensation product of N,N'-(2,2,6,6-tetramethylpiperidyl)-hexamethylenediamine and 4-tertoctylamino-2,6-dichloro-1,3,5-s-triazine, tris-(2,2,6,6-tetramethylpiperidyl)-nitrilotriacetate, tetrakis-(2,2,6,6- tetramethyl-4-piperidyl)-1,2,3,4-butane-tetracarbonic acid and 1,1'(1,2-ethanediyl)-bis-(3,3,5,5-tetramethylpiperazinone); plasticizers such as phthalates, adipates, glutarates, epoxidized vegetable oils, and the like; fungicides; pigments; dyes; reactive dyes; and moisture scavengers. Other additives are mentioned in U.S. Pat. No. 5,571,457, previously incorporated herein by reference.

The prepolymer-hardener mixtures of this invention, prior to curing, exhibit sufficiently low viscosities to facilitate mixing, pouring and air bubble diffusion, thereby allowing for the formation of bubble-free castings of both simple and intricate shapes. The resulting molded conductive articles exhibit low shrinkage during molding and subsequent thereto.

The polyether-based polyurethane elastomer compositions are capable of being made into shaped articles, such as transfer rollers and transfer belts, in which resistivity can be maintained at a pre-selected value over relatively long period of time during use, such as, for example, in a direct transfer process below $6 \times 10^9$ ohm-cm for from 600,000 to 1,000,000 images, preferably at least 1,000,000 images, and more preferably at least 2,000,000 images before the resistivity rises to a level above $6 \times 10^9$ ohm-cm requiring replacement of the transfer roller or belt. As can be appreciated by those skilled in the art, the pre-selected resistivity value can vary depending on whether the composition is used in a direct or indirect transfer process, and also on the specific configuration of electrophotographic equipment desired. Such shaped articles employing the composition of the invention can exhibit toughness, high elongation, high tensile strength and high tear strength and excellent abrasion resistance. The shaped articles can be designed to have a hardness ranging from 40 Shore A to 90 Shore A. For use in making electrically biasable transfer rollers and belts, a Shore hardness of from 40 to 90 Shore A durometers is preferred.

Figure 1:
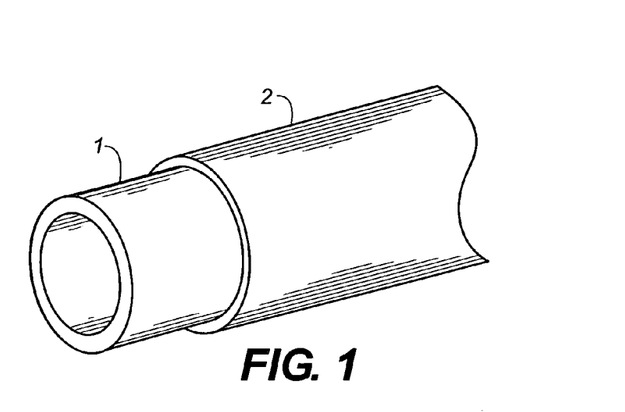
FIG. 1 is a schematic illustration of a conductive intermediate transfer roller used in electrophotographic equipment.

FIG. 1 shows a cut-away view of an electrically biasable transfer roller. The roller is can be formed upon a core 1 that is comprised of a conductive material, typically aluminum, nickel or copper metal, which is capable of readily responding to a biasing potential placed thereon. The core 1 can be in any shape, but typically is in the form of a solid cylindrical rod, a rigid hollow cylinder or drum, or a cylindrical, thin-walled, flexible tubular sleeve made out of a conductive material, such as a metal foil. Disposed over core 1 is a coating 2 comprised of a layer of a polyether polyurethane elastomer according to the present invention. Although not shown in FIG. 2, a primer or adhesive layer could be disposed between core 1 and coating 2 to facilitate bonding of the coating to the core; such primer or adhesive layer should have a resistivity comparable to that of the coating employed. Coating 2 is desirably a layer of 0.05 inch to 0.625 inch in thickness, and preferably is a layer of from 0.20 to 0.30 inches in thickness; however, any thickness that is capable of establishing a directional force field sufficient to transfer a photoconductive image is suitable.

A coating of the polyether polyurethane elastomer can be applied to the core by any suitable method or technique known to those skilled in the art, such as by spraying, casting in molds, affixing sheets of the material to a substrate member by suitable mechanical means or by suitable cement.

After the elastomer composition is applied to the core, it is preferred to condition the so-coated core in an environment with controlled levels of temperature and relative humidity. In general, such conditioning can be acceptably accomplished by placing the coated cores in an environment of 70° F. and 50% relative humidity for a period of at least about 12 days, and more preferably at least about 14 days.

Various top coatings, such as a polyurethane coating and/or ceramer coating as disclosed in U.S. Pat. Nos. 5,728,496 and 5,968,656, the teachings of which are incorporated herein by reference, and others as known to the art can be applied to the surface of the polyurethane elastomers of the invention to provide a protective barrier and/or release layer. Particularly preferred are the polyurethane silicate ceramer coatings described in U.S. Pat. No. 5,728,496, which are formed by a cross-linking reaction between a polyurethane having reactive alkoxysilane terminal moieties (where such polyurethane is the reaction product of one or more aliphatic polyols containing terminal hydroxyl groups with an alkoxysilane-substituted alkyl isocyanate) and a tetraalkoxysilane.

The biasable transfer members of the present invention have application in any suitable electrophotographic device such as, for example, an electrophotographic device, in which a transfer member, more particularly, a bias transfer roll, is used for electrically cooperating with a photoconductive element, plate, or surface when brought into contact therewith to attract toner particles bearing an electrostatic charge on the element or plate toward the roll. Transfer is accomplished by feeding a sheet of transfer material into the nip region formed by the surface of the transfer roll and the surface of a photoconductive insulative material or element bearing a developed image and imposing a potential on the transfer roll sufficient to cause the transfer of the toner particles or material from the surface of the photoconductive insulative material or element to the adjacent surface of the transfer member. In practice, any source of electrical power connected to the central conductive core of the transfer roll and capable of placing the transfer roll member at a potential sufficient to attract toner images from the photoconductive insulating surface toward the roll may be employed. A more complete discussion of the principles and configurations involved with bias transfer may be found in U.S. Pat. Nos. 2,951,443; 3,620,616; 3,633,543; 3,781,105; and 3,708,482, the teachings of which are incorporated herein by reference.

The following examples merely illustrate the present invention and it should be understood that such examples are not intended to limit the scope of the present invention.

Specific Embodiments

In the following examples, all parts and percentages are by weight and temperatures are in degrees Celsius (° C.), unless otherwise indicated.

EXAMPLES 1–5

Transfer Members Prepared With Varying Levels of Hydroxyl Functionality

Roller Preparation

In Examples 1 to 5, intermediate transfer rollers are prepared and evaluated in a test designed to determine their anticipated useful life when used for direct transfer in an electrophotographic process.

In each example, a layer of a polyether polyurethane composition according to the present invention is molded onto the outer surface of a cylindrically shaped solid steel rod which functions as a core substrate. The steel core is first sand blasted with a suitable abrasive material to roughen the surface thereof. Thereafter, each roughened core is placed into a mold assembly designed such that an uncured, liquid precursor for the polyether polyurethane composition of the invention, upon injection of the same into the mold assembly, will flow uniformly around the outer surface of the core.

Prior to injection of the liquid precursor, the mold assembly with core therein, is preheated to a temperature of 100° C. After preheating, the liquid precursor is injected into the mold, and the mold is then placed into an oven maintained at a temperature of 110° C. for at least 30 minutes to cure the polyurethane composition to a point at which it has gelled and has sufficient green-strength to be removed from the mold without damage to the resulting green polyurethane layer. Thereafter, the roller is placed in an oven maintained at a temperature of 100° C. for 8 hours to substantially complete the reaction and substantially cure the polyurethane composition.

The liquid precursor employed in Examples 1–5 consists of a mixture of three liquid starting materials described as follows:

A. a polyisocyanate prepolymer, which is a polymethylene-bis[4-cyclohexl diisocyanate] (VIBRATHANE® B635 polyisocyanate pre-polymer obtainable from Uniroyal Chemical Company);

B. a polyether polyol prepolymer, which is a polytetramethylene ether glycol (TERATHANE® polyether glycol obtainable from E.I. duPont de Nemours and Co. of Wilmington, Del.) having a weight average molecular weight of 1000 g/mole; and C. a hardener composition mixture consisting of
  a) 74 wt %, based on total weight of the hardener mixture, of a polyol cross-linking agent (TP 30 obtainable from Perstorp Polyols, Inc. of Toledo, Ohio);
  b) 25 wt %, based on total weight of the hardener mixture, of a dicarboxylate charge-control agent as disclosed in U.S. Pat. No. 4,729,925 [specifically poly(oxy(1-oxo-1,6-hexanediyl)), alpha, alpha' oxydi-2,1-ethanediyl) bis(w-hydroxy-5-sulfo-1,3-benzenedicarboxylate (2:1), ion (1-)methyltriphenylphosphonium obtainable from Eastman Kodak Company of Rochester, N.Y.]; and
  c) 1 wt %, based on total weight of the hardener mixture, of triethylenediamine as catalyst.

The proportions of the three starting materials used in making the liquid precursor employed in Examples 1–5 is shown in Table I below.

TABLE I

Proportions of Starting Materials Used for Polyether Polyurethane Layer in Examples 1–5

| Example No. | A (parts) | B (parts) | C (parts) | Equivalent Ratio (—OH— to —NCO) |
|---|---|---|---|---|
| 1 | 100 | 69.6 | 3.9 | 0.96 |
| 2 | 100 | 71.2 | 3.9 | 0.98 |
| 3 | 100 | 72.6 | 3.9 | 1.00 |
| 4 | 100 | 74.1 | 4.0 | 1.02 |
| 5 | 100 | 76.7 | 3.9 | 1.04 |

In Examples 1–5, the amount of charge-control agent is held constant at 0.54 wt % based on total weight of the liquid precursor.

After the rollers are coated with the layer of cured polyether polyurethane and removed from the oven, the so-coated rollers are allowed to cool to room temperature. The rollers are then ground to provide an elastomer layer thickness of 0.635 cm.

Performance Testing

Prior to performance testing, the rollers prepared as described above are first conditioned for two weeks by placing them in an environmental test chamber (obtainable from Tenney Engineering, Inc.) with a controlled environment, set to maintain conditions therein at a temperature of 70° F. and relative humidity of 50%. Thereafter, the conditions are adjusted so that the chamber is maintained at a temperature of 80° F. and relative humidity of 10% for an additional two weeks.

The conditioned transfer rollers are then evaluated in an accelerated aging test which subjects the roller to the type of current flow which would exist during use of the roller to directly transfer toner images in an electrophotographic machine. The test is also conducted in the above-described environmental test chamber wherein the conditions are maintained at a temperature of 80° F. and relative humidity of 10%, i.e., under worse case, high-stress conditions.

A test fixture is provided within the environmental test chamber that can simulate actual machine transfer mode by electrically biasing a transfer roller (as prepared above) while rotating the roller in contact with an electrically grounded drum. The electrical bias used to bias the transfer roller is held at a substantially constant 45 µA. The transfer roller was rotated at linear speed of 17.5 inch/sec, which, assuming a frame length of 9.54 inches/copy, is representative of operation at a machine speed of 110 prints/minute or 6,604 prints/hour.

A resistivity measurement device is also placed in the test chamber. The device is equipped with a power supply, current probe, and ammeter to periodically measure resistivity of the transfer roller. To measure resistivity, a power supply sufficient to apply a potential of 1,000 volts is connected by an electrical circuit to the metal core of the roller, and a current probe is adapted such that it can make contact with the roller's elastomer surface. The current probe has a curved pad with a radius equal to the radius of the roller, which pad has a contact area with the roller of 2.33 cm². The ammeter is also connected by electrical circuit to the current probe. The probe is then allowed to make contact with the elastomer surface, whereupon current flows from the power supply to the core, through the elastomer, into the probe, and through the ammeter to ground. The ammeter measures the current flow in terms of microamps ("µA"). Resistivity is calculated using the formula:

$$\rho = (V \cdot A)/(I \cdot t)$$

wherein:
  $\rho$ is the roller volume resistivity in ohm-cm;
  V is the applied voltage in volts;
  A is the area of the current probe pad in cm²;
  I is the measured current flow in amps; and
  t is the elastomer layer thickness in cm.

Once the test begins, the roller is removed from the test fixture approximately once every 24 hours and the resistivity measurement device is used to determine the roller's resistivity at that point in time. This procedure is repeated until the roller's resistivity reaches a value of $6 \times 10^9$ ohm-cm, as explained hereinbelow. For the rollers in Examples 1–5, the initial resistivity values range from $5 \times 10^8$ to $1 \times 10^9$ ohm-cm.

Using the resistivity data, the useful life of each roller is determined by locating the point at which a roller's resistivity rises to a value of $6 \times 10^9$ ohm-cm, which is considered to be at a point where poor image quality can begin to occur. The number of hours required to reach a resistivity of $6 \times 10^9$ ohm-cm for a roller is then multiplied by 6,604 prints/hour to yield an estimated number of prints, for a machine operating at a speed of 110 prints/min, that would be obtained during the time prior to the roller resistivity reaching $6 \times 10^9$ ohm-cm. For example, if the resistivity for a roller reaches $6 \times 10^9$ ohm-cm after 24 hours, then an estimate for the number of prints obtained would be 24 hours×6604 prints/hour, or 158,496 prints.

Figure 2:
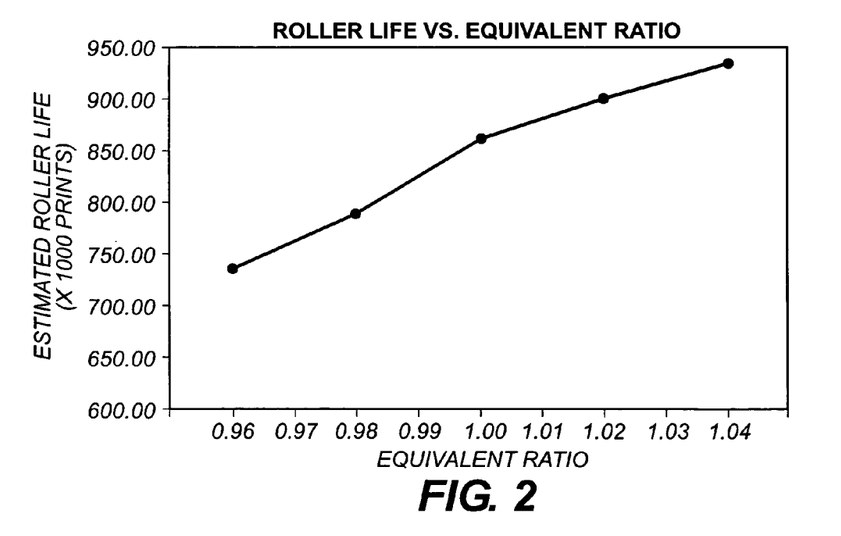
FIG. 2 is a graph illustrating data relating to Examples 1–5 for a direct transfer roller employing a polyether polyurethane composition according to the invention, which data show roller life (in terms of copies made) versus the equivalent ratio of hydroxyl group functionality to isocyanate group functionality in the composition.

Using the above procedure, the estimated number of prints obtained before roller resistivity reaches a value of $6 \times 10^9$ ohm-cm is determined for each roller, and the results are graphically displayed in FIG. 2. As can be seen in FIG. 2, the molar equivalent ratio of hydroxyl functionality to isocyanate functionality used in making the resulting polyether polyurethane layer has a significant effect on roller life. As the ratio increases from 0.96 to 1.04, the estimated life of a transfer roller rises from about 740,000 prints to about 925,000 prints, i.e., a gain of about 185,000 prints or 25% improvement over the range displayed, even during the artificially induced, high stress environmental condition.

By adjusting the equivalent ratio of hydroxyl group functionality to isocyanate group functionality in the starting materials, preferably to levels of about 1.00 or greater, one can obtain polyether polyurethane elastomer compositions which, even under stress conditions, can provide transfer rollers that desirably maintain a pre-selected resistivity level for the roller over a relatively long period of time, thereby obtaining from 600,000 to 1,000,000 images, preferably at least 1,000,000 images, and more preferably at least 2,000,000 images, before the resistivity exceeds the pre-selected level.

Similar results are expected using the other prepolymers, charge-control agents and additives as mentioned hereinabove.

"Electrophotography" and "electrophotographic" as used herein are broad terms that include image-forming processes involving the development of an electrostatic charge pattern formed on a surface with or without light exposure, and thus includes xerography, and other similar processes.

Although the invention has been described in considerable detail, and with particular reference to preferred embodiments, it should be understood that variations and modifications to such embodiments could be made within the scope of the invention.

We claim:

1. A polyurethane elastomer comprising the reaction product of:
   a polyisocyanate prepolymer formed by reacting an isocyanate with a polyol, said polyisocyanate prepolymer being present in an amount of from 45 to 70 weight percent based on total weight of the elastomer composition;
   a polyether polyol prepolymer present in an amount of from 25 to 50 weight percent based on total weight of the elastomer composition; and
   a hardener mixture comprising at least one additional polyol and at least one charge-control agent, the at least one charge control agent being a polyol capable of being copolymerized with the polyisocyanate prepolymer, the polyether polyol, and the hardener mixture, the hardener
   m and n are integers which together are of sufficient value to achieve an $R^1$ weight average molecular weight of 300 to 30,000;
   p and q are integers which together are of sufficient value to achieve an $R^7$ weight average molecular weight of 300 to 30,000; and M represents hydrogen, an alkali metal, ammonium, or $P^+(C_6H_5)_3CH_3$.

2. The elastomer of claim 1 wherein the charge-control agent is a polyol charge-control agent selected from at least one of formula (I) or formula (II):

(I)

(II)

wherein $R^1$ represents:

$R^6$ represents sulfonate, oxyphenylene sulfonate, oxycyclohexylene sulfonate, or p-toluenesulfonamidosulfonyl;
$R^2$ represents oxyphenylene sulfonate, oxycyclohexylene sulfonate, or p-toluenesulfonamidosulfonyl;
$R^7$ represents:

$R^3$ represents a straight or branched chain alkylene group having 2 to 7 carbon atoms;
$R^4$ is the same as $R^3$ or is $R^5$ is the same as $R^3$;
x is 1 to 10;
m and n are integers which together are of sufficient value to achieve an $R^1$ weight average molecular weight of 300 to 30,000;
p and q are integers which together are of sufficient value to achieve an $R^7$ weight average molecular weight of 300 to 30,000; and
M represents hydrogen, an alkali metal, ammonium, or $P^+(C_6H_5)_3CH_3$.

3. The elastomer of claim 1 wherein the charge-control agent is poly(oxy(1-oxo-1,6-hexanediyl)), alpha, alpha' oxydi-2,1-ethanediyl)bis(w-hydroxy-5-sulfo-1,3-benzene-dicarbox-ylate(2:1), ion (1-)methyltriphenylphosphonium.

4. The elastomer of claim 2 wherein x is from 2 to 7.

5. The elastomer of claim 2 wherein the charge-control agent is present in an amount of less than 2 weight percent based on total weight of the elastomer.

6. The elastomer of claim 2 wherein the charge-control agent is present in an amount of less than 1 weight percent based on total weight of the elastomer.

7. The elastomer of claim 2 wherein the charge-control agent is present in an amount of from 0.4 to 0.7 weight percent based on total weight of the elastomer.

8. The elastomer of claim 1 having a resistivity of less than $6\times10^9$ ohm-cm.

9. A shaped article comprising the elastomer of claim 1.

10. A polyurethane elastomer comprising the reaction product of:
   a polyisocyanate prepolymer formed by reacting an isocyanate with a polyol, said polyisocyanate prepolymer being present in an amount of from 45 to 70 weight percent based on total weight of the elastomer composition;
   a polyether polyol prepolymer present in an amount of from 25 to 50 weight percent based on total weight of the elastomer composition; and
   a hardener mixture comprising at least one additional polyol and at least one charge-control agent capable of being copolymerized with the polyisocyanate prepolymer, the polyether polyol prepolymer, and the hardener mixture such that the charge-control agent is covalently bonded to the polyurethane elastomer, the hardener mixture being present in an amount of from 1 to 25 weight percent of the total elastomer composition,
   the amounts of the polyisocyanate prepolymer, the polyether polyol prepolymer, and hardener mixture being selected such that the equivalent ratio of hydroxyl functionality to isocyanate functionality is from 0.96 to 1.04, and the charge-control agent is present in an amount of less than 2 weight percent based on total weight of the elastomer.

11. The elastomer of claim 10 wherein the charge-control agent is a polyol comprising an ionic functional group.

12. The elastomer of claim 10 wherein the charge-control agent is a polyol charge-control agent selected from at least one of formula (I) or formula (II):

(I)

(II)

wherein $R^1$ represents:

$R^6$ represents sulfonate, oxyphenylene sulfonate, oxycyclohexylene sulfonate, or p-toluenesulfonamidosulfonyl;

$R^2$ represents oxyphenylene sulfonate, oxycyclohexylene sulfonate, or p-toluenesulfonamidosulfonyl;

$R^7$ represents:

$R^3$ represents a straight or branched chain alkylene group having 2 to 7 carbon atoms;

$R^4$ is the same as $R^3$ or is $R^5$ is the same as $R^3$;

x is 1 to 10;

m and n are integers which together are of sufficient value to achieve an $R^1$ weight average molecular weight of 300 to 30,000;

p and q are integers which together are of sufficient value to achieve an $R^7$ weight average molecular weight of 300 to 30,000; and M represents hydrogen, an alkali metal, ammonium, or $P^+(C_6H_5)_3CH_3$.

13. The elastomer of claim 10 wherein the charge-control agent is poly(oxy(1-oxo-1,6-hexanediyl)), alpha, alpha' oxydi-2,1-ethanediyl)bis(w-hydroxy-5-sulfo-1,3-benzenedi-carboxylate (2:1), ion (1-)methyltriphenylphosphonium.

14. The elastomer of claim 12 wherein x is from 2 to 7.

15. The elastomer of claim 12 wherein the charge-control agent is present in an amount of less than 1 weight percent based on total weight of the elastomer.

16. The elastomer of claim 12 wherein the charge-control agent is present in an amount of from 0.4 to 0.7 weight percent based on total weight of the elastomer.

17. The elastomer of claim 10 having a resistivity of less than $6\times10^9$ ohm-cm.

18. A shaped article comprising the elastomer of claim 10.

19. A polyurethane elastomer comprising:
   a polyisocyanate prepolymer formed by reacting an isocyanate with a polyether polyol, said polyisocyanate prepolymer being present in an amount of from 45 to 70 weight percent based on total weight of the elastomer composition;
   a polyether polyol prepolymer present in an amount of from 25 to 50 weight percent based on total weight of the elastomer composition; and
   a hardener mixture comprising at least one additional polyol and at least one polyol charge-control agent, the hardener mixture being present in an amount of from 1 to 25 weight percent of the total elastomer composition,
   the amounts of the polyisocyanate prepolymer, the polyether polyol prepolymer, and the hardener mixture being selected such that the equivalent ratio of hydroxyl functionality to isocyanate functionality is from 1.00 to 1.04, and the charge-control agent is present in an amount of less than 1 weight percent based on total weight of the elastomer, the polyol charge-control agent being selected from at least one of formula (I) or formula (II):

(I)

(II)

wherein $R^1$ represents:

$R^6$ represents sulfonate, oxyphenylene sulfonate, oxycyclohexylene sulfonate, or p-toluenesulfonamidosulfonyl;

$R^2$ represents oxyphenylene sulfonate, oxycyclohexylene sulfonate, or p-toluenesulfonamidosulfonyl;

$R^7$ represents:

$R^3$ represents a straight or branched chain alkylene group having 2 to 7 carbon atoms;

$R^4$ is the same as $R^3$ or is $R^5$ is the same as $R^3$;

x is from 2 to 7;

m and n are integers which together are of sufficient value to achieve an $R^1$ weight average molecular weight of 300 to 30,000;

p and q in are integers which together are of sufficient value to achieve an $R^7$ weight average molecular weight of 300 to 30,000; and M represents hydrogen, an alkali metal, ammonium, or $P^+(C_6H_5)_3CH_3$.

* * * * *